(12) United States Patent
Ramanujam

(10) Patent No.: US 10,023,231 B2
(45) Date of Patent: Jul. 17, 2018

(54) PARKING AUTONOMOUS VEHICLES

(71) Applicant: Madhusoodhan Ramanujam, Salt Lake City, UT (US)

(72) Inventor: Madhusoodhan Ramanujam, Salt Lake City, UT (US)

( * ) Notice: Subject to any disclaimer, the term of this patent is extended or adjusted under 35 U.S.C. 154(b) by 52 days.

(21) Appl. No.: 14/824,084

(22) Filed: Aug. 12, 2015

(65) Prior Publication Data

US 2015/0346727 A1 Dec. 3, 2015

(51) Int. Cl.
*G05D 1/00* (2006.01)
*G05D 1/02* (2006.01)
*B62D 15/02* (2006.01)

(52) U.S. Cl.
CPC ....... *B62D 15/0285* (2013.01); *G05D 1/0088* (2013.01); *G05D 1/0212* (2013.01); *G05D 2201/0212* (2013.01); *G05D 2201/0213* (2013.01)

(58) Field of Classification Search
CPC ............. B62D 15/0285; G05D 1/0088; G05D 1/0212; G05D 2201/0213; G05D 2201/0212
See application file for complete search history.

(56) References Cited

U.S. PATENT DOCUMENTS

| 8,078,349 | B1 | 12/2011 | Prada Gomez | |
| 2010/0183409 | A1* | 7/2010 | Checketts | B60K 17/30 414/231 |
| 2012/0083959 | A1 | 4/2012 | Dolgov | |
| 2012/0083960 | A1 | 4/2012 | Zhu | |
| 2013/0231824 | A1* | 9/2013 | Wilson | G05D 1/0246 701/26 |
| 2014/0016826 | A1 | 1/2014 | Fairfield | |
| 2014/0306833 | A1* | 10/2014 | Ricci | B60Q 1/00 340/901 |
| 2014/0309789 | A1* | 10/2014 | Ricci | B60Q 1/00 700/276 |
| 2014/0309864 | A1* | 10/2014 | Ricci | H04W 48/04 701/36 |
| 2014/0309934 | A1* | 10/2014 | Ricci | H04W 48/04 701/537 |
| 2014/0310075 | A1* | 10/2014 | Ricci | H04W 48/04 705/13 |

(Continued)

*Primary Examiner* — Jelani A Smith
*Assistant Examiner* — Majdi Alsomiri
(74) *Attorney, Agent, or Firm* — Madhusoodhan Ramanujarr

(57) ABSTRACT

Technology is described for parking autonomous vehicles. An autonomous vehicle may receive an instruction to park the autonomous vehicle. The instruction may be received when the autonomous vehicle is in a preselected location. The autonomous vehicle may select at least one parking area that potentially has available parking spaces to park the autonomous vehicle using, in part, a defined set of parking criteria. Commands may be provided to drive the autonomous vehicle to the parking area. The autonomous vehicle may be configured to select an available parking space within the parking area to park the autonomous vehicle. The autonomous vehicle may send a confirmation message after the autonomous vehicle is parked in the available parking space within the parking area. The confirmation message may include a parking location associated with the autonomous vehicle.

20 Claims, 10 Drawing Sheets

(56) References Cited

U.S. PATENT DOCUMENTS

2015/0149022 A1* 5/2015 Harvey .................. E04H 6/422
           701/23
2016/0171894 A1* 6/2016 Harvey ................ G05D 1/0088
           701/23

* cited by examiner

PARKING AUTONOMOUS VEHICLES

BACKGROUND

Autonomous vehicles, such as self-driving cars, may operate with minimal or substantially no human input. For example, a passenger may enter a destination at a console of the autonomous vehicle, such as a touch screen, and the autonomous vehicle may navigate itself to the destination (e.g., a movie theater) by sensing its surrounding environment. The autonomous vehicle may sense its surroundings using a combination of sensors, cameras, radar, light detection and ranging (LIDAR), global positioning system (GPS), etc.

Autonomous vehicles offer a large number of benefits as compared to traditional automobiles. For example, autonomous vehicles may reduce traffic collisions due to the autonomous vehicle's increased reliability and improved reaction time as compared to human drivers. Autonomous vehicles may increase roadway capacity and reduce traffic congestion. In addition, passengers that are under age, elderly, disabled, intoxicated, or otherwise impaired may benefit from traveling in autonomous vehicles.

DETAILED DESCRIPTION

Figure 1:
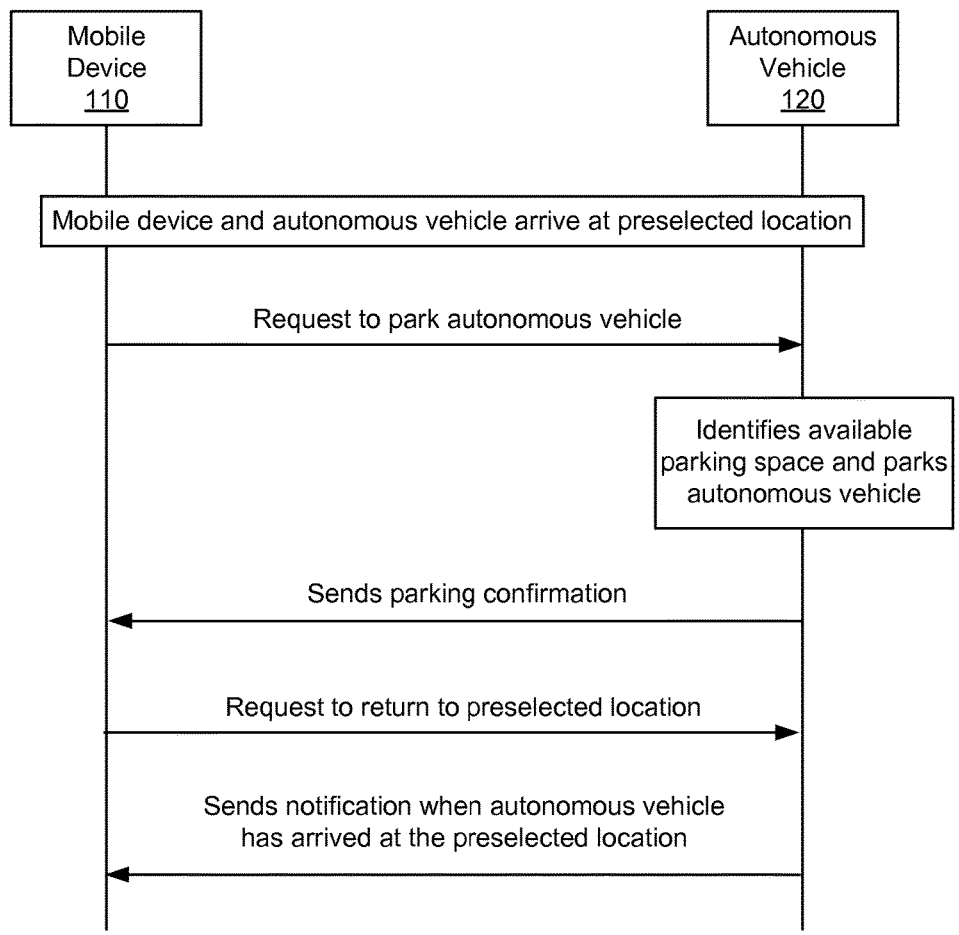
FIG. 1 illustrates a mobile device in communication with an autonomous vehicle according to an example of the present technology.

Technology is described for instructing an autonomous vehicle to park autonomously and then instructing the autonomous vehicle to return to a preselected location. One example of an autonomous vehicle is a self-driving car or a driverless car. The autonomous vehicle may drive a user to the preselected location based on instructions from the user. For example, the user may enter a name or address of the preselected location, such as a movie theater or office building. In one example, the user may be a passenger in the autonomous vehicle, or alternatively, the user may select a destination for passengers within the autonomous vehicle (e.g., children, mentally handicapped passengers) and then the autonomous vehicle may drive the passengers to the destination.

The autonomous vehicle may drive to the preselected location and identify a drop off area in proximity to the preselected location. The autonomous vehicle may temporarily stop at the drop off area to permit the passengers to exit the autonomous vehicle. In one example, the autonomous vehicle may follow road signs in order to locate the drop off area. Alternatively, the autonomous vehicle may locate the drop off area upon accessing a database containing information about a plurality of drop off areas that are located in proximity to the preselected location.

In one configuration, the user may instruct the autonomous vehicle to park itself in an available parking space after being dropped off at the drop off area. The autonomous vehicle may verify that the passengers are outside the vehicle and it is safe to exit the drop off area. The autonomous vehicle may drive to a preselected parking location (e.g., a parking garage, an area with ample street parking). In one example, the preselected parking location may be previously chosen by the user. The autonomous vehicle may locate an available parking space and park itself in the parking space. The autonomous vehicle may analyze signs located in proximity to the available parking space to confirm that parking is allowed. The autonomous vehicle may send a message to the user's mobile device indicating that the autonomous vehicle was successfully parked and the location of the autonomous vehicle.

In an alternative configuration, the autonomous vehicle may exit the drop off area after dropping off the passengers and search for an available parking space to park the autonomous vehicle. The autonomous vehicle may select a parking area that potentially has available parking spaces to park the autonomous vehicle using a set of parking rules. For example, the parking rules may indicate that parking areas with parking spaces that are free of cost and within a defined distance from the preselected location are assigned a first priority level. The parking rules may indicate that parking areas with parking spaces that are within a first cost range and are within the defined distance from the preselected location are assigned a second priority level. The parking rules may indicate that parking areas with parking spaces that are within a second cost range and are within the defined distance from the preselected location are assigned a third priority level. In general, parking areas with an increased cost may be assigned a lower priority and parking areas with a decreased cost may be assigned a higher priority. In addition, the parking rules may indicate that parking areas located on a particular street or neighborhood, or located closest to the preselected location, may be assigned a certain priority level. The autonomous vehicle may drive the autonomous vehicle to a selected parking area, search for an available parking space in the selected parking area, and then park itself after locating the available parking space.

In one example, the autonomous vehicle may access a database containing information about a plurality of parking garages that are located within the defined distance from the preselected location (e.g., 10 miles from the preselected location). The autonomous vehicle may identify, using the database, parking garages that have available parking spaces and a cost associated with parking in these parking garages. The autonomous vehicle may compare the parking garages, and using the parking rules provided by the user, select one of the parking garages for parking the autonomous vehicle. The autonomous vehicle may drive to the selected parking garage and search for an available parking space. The autonomous vehicle may locate the available parking space and then park itself in the space.

In one configuration, the autonomous vehicle may communicate with a parking payment system when parking in the available parking space. The parking payment system may be associated with the parking area (e.g., a parking garage or street parking area). After parking in the available parking space, the autonomous vehicle may send a first message with a first time stamp to the parking payment system. The first message may indicate that the autonomous vehicle has parked in the available parking space. In addition, the first message may include billing information for a user associated with the autonomous vehicle. When the autonomous vehicle exits the parking area, a second message with a second time stamp may be communicated to the parking payment system indicating that the autonomous vehicle is exiting the parking area. The parking payment system may calculate an amount of time the autonomous vehicle was parked in the parking space based on the first time stamp and the second time stamp. The payment parking system may automatically charge the user associated with the autonomous vehicle using the user's billing information.

In an alternative configuration, the autonomous vehicle may be equipped with a radio frequency (RF) identity (ID) tag. The RF ID tag may be associated with a user's account information. The parking area may include enter and exit lanes that are equipped with an RFID tag reader. When the autonomous vehicle enters or exits the parking area, the RFID tag reader may identify the user's account information from the RF ID tag. The RFID tag reader may function in conjunction with the parking payment system to charge the user an appropriate fee for parking the autonomous vehicle in the parking area.

In one configuration, the autonomous vehicle may receive a message when the user is ready to be picked up. For example, the autonomous vehicle may receive the message from the user's mobile device. The autonomous vehicle may acknowledge that the message was received from the user's mobile device. In addition, the autonomous vehicle may send an estimated amount of time for the autonomous vehicle to arrive at the user's location. The autonomous vehicle may exit the parking space and drive to pick up the passengers. In one example, the autonomous vehicle may return to the drop off area where the autonomous vehicle previously dropped off the user. In other words, the autonomous vehicle may return to a pickup area that is the same as the drop off area. Alternatively, the message from the user's mobile device may indicate a modified pickup area for the autonomous vehicle to pick up the user. The autonomous vehicle may notify the user when the autonomous vehicle is approaching (e.g., five minutes away) either the pickup area or the modified pickup area.

In an alternative configuration, the autonomous vehicle may automatically return to the drop off area according to the user's calendar. For example, the autonomous vehicle may drop off the user at a movie theater and then park itself in an available parking space. The user's calendar may indicate that the movie runs until 5:45 PM. Therefore, the autonomous vehicle may return to the drop off area when the movie is scheduled to be finished. In addition, the autonomous vehicle may send a confirmation to the user's mobile device indicating that the autonomous vehicle will return to the drop off area at 5:45 PM. If the user's schedule changes (e.g., the movie runs over its original end time), the user may instruct the autonomous vehicle to stay at the parking space until further notice.

In one example, the autonomous vehicle may wait at the pickup area until the user returns to the autonomous vehicle. If the user does not return within a predefined period of time (e.g., 5 seconds), the autonomous vehicle may send an additional notification to the user that the autonomous vehicle is waiting in the pickup area. If the user still does not return (e.g., for another 5 minutes), the autonomous vehicle may locate an available parking space and notify the user of the autonomous vehicle's location.

When the user returns to the autonomous vehicle, the autonomous vehicle may verify that the user is allowed to enter into the autonomous vehicle. For example, the user may be carrying a keychain that, if placed in proximity to the autonomous vehicle, verifies that the user is authorized to enter into the autonomous vehicle. As another example, the autonomous vehicle may detect that the user's mobile device is in proximity to the autonomous vehicle, and therefore, the user is presumed to be carrying the mobile device and is authorized to enter into the autonomous vehicle.

FIG. 1 illustrates a system and related operations for parking an autonomous vehicle 120. The autonomous vehicle 120 may contain a passenger carrying a mobile device 110. The autonomous vehicle 120 may travel to a preselected location (e.g., a restaurant, a shopping mall). The preselected location may be selected by the passenger riding in the autonomous vehicle 120. After arriving at the preselected location, the passenger may exit the autonomous vehicle 120 and using the mobile device 110, the passenger may instruct the autonomous vehicle 120 to park in an available parking space. The autonomous vehicle 120 may provide commands to drive to one or more parking areas in search for an available parking space. In one example, the parking areas may be previously defined by the passenger. In an alternative example, the autonomous vehicle 120 may identify the parking areas using a set of parking criteria. For example, the parking criteria may indicate that parking areas with potentially available parking spaces that are free of cost are assigned a higher priority level, whereas parking areas with potentially available parking spaces that include a parking fee are assigned a lower priority level. The autonomous vehicle 120 may select at least one of the parking areas based on the parking criteria. The autonomous vehicle 120 may drive to the parking area, identify an available parking space within the parking area, and park in the available parking space. If the selected parking area does not have any available parking spaces, the autonomous vehicle 120 may drive to another parking area in search of an available parking space.

The autonomous vehicle 120 may send a parking confirmation message to the mobile device 110 after parking in the available parking space. The parking confirmation message may include a parking location of the autonomous vehicle 120. At a later time, the mobile device 110 may send a request for the autonomous vehicle 120 to return to the preselected location in order to pick up the passenger. Alternatively, the request may indicate a modified location for picking up the passenger. In one example, the modification location may include the mobile device's current location. The autonomous vehicle 120 may drive to the preselected location or the modified location in order to pick up the passenger. The autonomous vehicle 120 may send a confirmation message to the mobile device 110 indicating that the autonomous vehicle 120 is driving to the preselected location or the modified location. In addition, the autonomous vehicle 120 may send a notification when the autonomous vehicle 120 has arrived at the preselected location or the modified location.

The technology described herein may enable the passenger to travel to the selected location and instruct the autonomous vehicle 120 to automatically park, and then at a later time, the passenger may instruct the autonomous vehicle 120 to return to the passenger's location. The passenger is not burdened with looking for a parking space and then walking from the parking space to the selected location. Similarly, the passenger is not burdened by walking back to the parking space to retrieve the autonomous vehicle 120.

Figure 2:
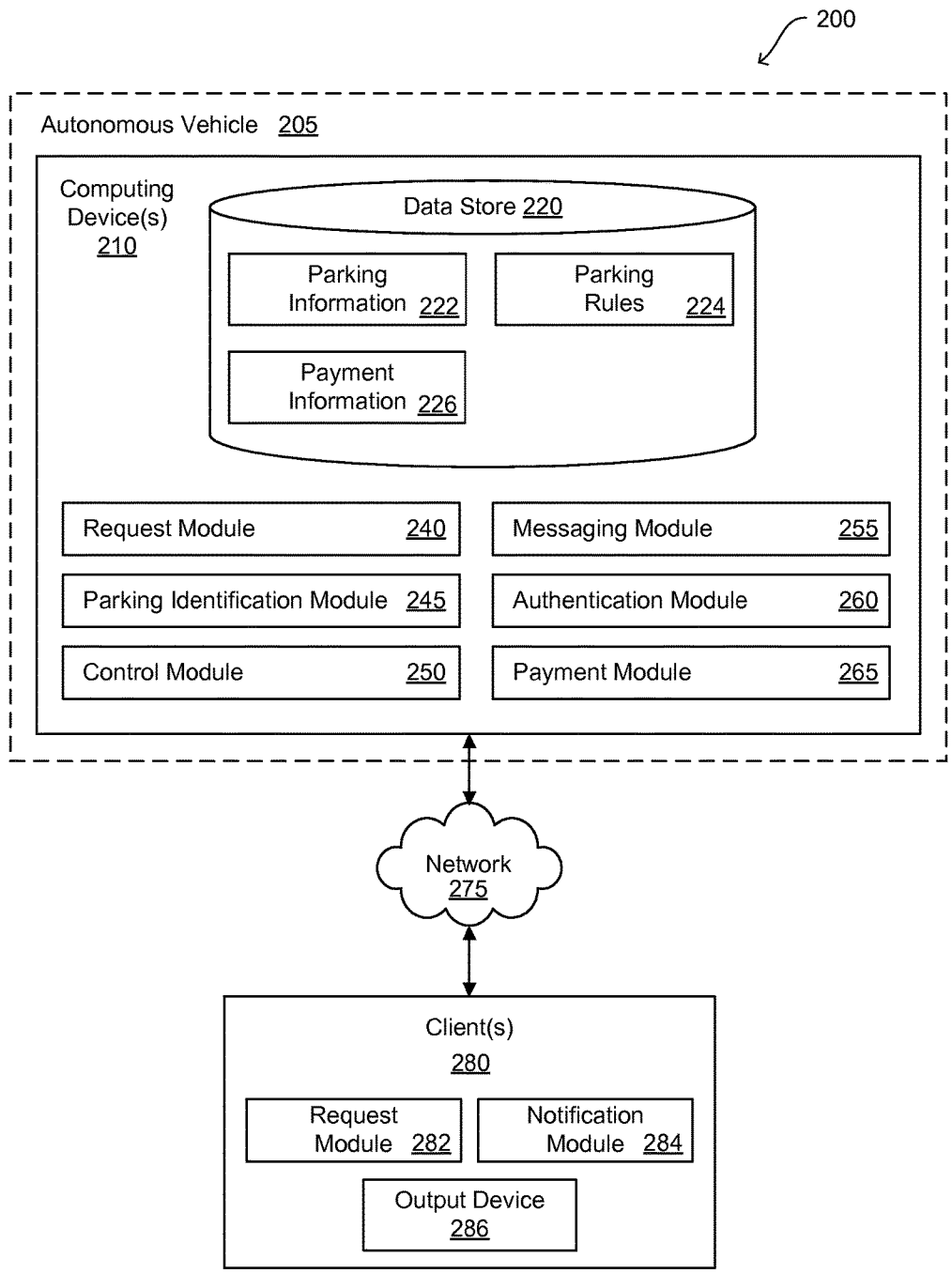
FIG. 2 is an illustration of a networked system for parking autonomous vehicles according to an example of the present technology.

In the following discussion, a general description of an example system for parking an autonomous vehicle and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a client 280 by way of a network 275. In one example, the computing device 210 may be included in an autonomous vehicle 205, and the client 280 may include a mobile device of a passenger associated with the autonomous vehicle 205. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include parking information 222. The parking information 222 may include a plurality of parking areas that potentially have available spaces for parking the autonomous vehicle 205. The parking areas may be associated with known geographical locations. For example, the parking information 222 may include a list of parking garages and/or streets that potentially have available parking spaces for parking the autonomous vehicle 205. As a non-limiting example, the parking information 222 may indicate twelve parking garages within a defined geographical region (e.g., within a half-mile radius). As another non-limiting example, the parking information 222 may indicate that Street A includes potentially available parking spaces for vehicles, but Street B does not include parking spaces for vehicles. For each potential parking area (e.g., parking garage, street), the parking information 222 may include rate information (e.g., $4/hour or free after 7 PM), maximum parking times (e.g., 3-hour parking), parking restrictions (e.g., no parking from 12 AM to 5 AM), and other types of parking-related information. In one configuration, the parking information 222 may indicate in real-time available parking spaces within a certain geographical region. For example, the parking information 222 may indicate that a particular parking garage currently has ten available parking spaces, or that a particular street currently has two available parking spaces.

The data stored in the data store 220 may include parking rules 224. The parking rules 224 may be defined by a passenger and/or owner associated with the autonomous vehicle 205. The parking rules 224 may define a hierarchy of parking preferences to be utilized when parking the autonomous vehicle 205. The parking rules 224 may be specific for each passenger that uses the autonomous vehicle 205. In one example, the parking rules 224 may indicate that parking areas with parking spaces that are free of cost and within a defined distance from a preselected location (e.g., a passenger drop-off location) are assigned a first priority level. In other words, free parking spaces may generally be preferred over parking spaces that are not free. The parking rules 224 may indicate that parking areas with parking spaces that are within a first cost range and are within the defined distance from the preselected location are assigned a second priority level, and parking areas with parking spaces that are within a second cost range and are within the defined distance from the preselected location are assigned a third priority level, wherein the first cost range is less than the second cost range. For example, between a first parking area that costs $2/hour and a second parking area that costs $10/hour, the first parking area may be assigned a higher priority level than the second parking area provided that both parking areas are within the defined distance from the preselected location (e.g., 5 miles). In addition, the parking rules 224 may indicate that parking areas that are not within the defined distance from the preselected location and/or are above a cost threshold may be assigned a reduced priority level. In one example, the parking rules 224 may include a list of preferred parking areas that are preselected by the passenger and/or owner associated with the autonomous vehicle 205.

The data stored in the data store 220 may include payment information 226. The payment information 226 may be associated with the passenger of the autonomous vehicle 205. The payment information 226 may include the passenger's credit card information, bank information, address, contact information, etc. In one example, the payment information 226 may be automatically accessed (e.g., by a parking payment system) when the autonomous vehicle 205 parks in a certain parking space or when the autonomous vehicle 205 exits a parking area (e.g., a parking garage).

The components executed on the computing device 210 may include a request module 240, a parking identification module 245, a control module 250, a messaging module 255, an authentication module 260, a payment module 265, and other applications, services, processes, systems, engines, or functionality not discussed in detail herein. The request module 240 may be configured to receive a request, at the autonomous vehicle 205, to park the autonomous vehicle 205 after driving to a preselected location. For example, the autonomous vehicle 205 may drive to the preselected location (e.g., a sports stadium, a library, a park), and after arriving at the preselected location, the request module 240 may receive the request from a passenger associated with the autonomous vehicle 205. In one example, the request module 240 may receive the request from the client 280. In addition, the request module 240 may receive an additional request from the client 280 for the autonomous vehicle 205 to return to the preselected location, or to drive to a modified location in order to pick up the passenger.

The parking identification module 245 may be configured to identify a parking area with potentially available parking spaces to park the autonomous vehicle 205 based on the parking rules 224. The parking area may include certain parking garages, streets, neighborhoods, etc. The parking area may be preselected by the passenger associated with the autonomous vehicle 205, or alternatively, the parking area may be selected by the autonomous vehicle 205 using the parking rules 224. The parking rules 224 may indicate that parking areas with parking spaces that are free of cost and within a defined distance from a preselected location are assigned a highest priority level, and parking areas with parking spaces that are not free of cost and/or not within the defined distance are assigned a reduced priority level. In other words, the parking rules 224 may indicate that the available parking space is to be within a predefined travel time from the preselected location and within a defined distance from the preselected location. After the autonomous vehicle arrives at a selected parking area, the parking identification module 245 may identify an available parking space within the selected parking area. For example, the parking identification module 245 may analyze signs located in proximity to the available parking space to confirm that parking is allowed in the space.

The control module 250 may be configured to provide commands to drive the autonomous vehicle 205 to the preselected location. In particular, the control module 250 may provide commands to the autonomous vehicle's actuators, thereby controlling steering, acceleration, braking and throttle of the autonomous vehicle 205. The control module 250 may provide commands to drive the autonomous vehicle 205 to the selected parking area in order to search for an available parking space. The control module 250 may provide commands to park the autonomous vehicle 205 upon identification of the available parking space. In addition, the control module 250 may provide commands to drive the autonomous vehicle 205 back to the preselected location or the modified location.

The messaging module 255 may be configured to send a confirmation message when the autonomous vehicle 205 is parked in the available parking space. The confirmation message may include a parking location associated with the autonomous vehicle 205, a cost associated with parking the autonomous vehicle 205 in the available parking space, etc. The messaging module 255 may send the confirmation message to the client 280. In another example, the messaging module 255 may send a notification when the autonomous vehicle 205 has returned to the preselected location or the modified location.

The authentication module 260 may be configured to authenticate the client 280 before allowing a passenger associated with the client 280 to enter into the autonomous vehicle 205. When the passenger returns to the autonomous vehicle 205, the authentication module 260 may verify that the passenger is permitted to enter into the autonomous vehicle 205. For example, the authentication module 260 may verify that the passenger is authorized to enter into the autonomous vehicle 205 when a keychain (e.g., that is worn by the passenger) is placed in proximity to the autonomous vehicle 205. As another example, the authentication module 260 may detect that the client 280 is in proximity to the autonomous vehicle 205, and therefore, the passenger may be presumed to be carrying the client 280 and is authorized to enter into the autonomous vehicle 205.

The payment module 265 may be configured to communicate with a parking payment system. The parking payment system may be associated with a parking area (e.g., a parking garage) or a city parking system. The payment module 265 may submit an appropriate payment when the autonomous vehicle 205 parks in a parking space that necessitates payment for parking in that parking space. For example, the payment module 265 may submit the appropriate payment when the autonomous vehicle 205 enters or exits the parking area. The payment module 265 may utilize the payment information 226 when paying to park in the parking area.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. For purposes of convenience, the computing device 210 is referred to herein in the singular. Even though the computing device 210 is referred to in the singular, it is understood that a plurality of computing devices 210 may be employed. As previously described, the computing device 210 may be operating within an autonomous vehicle 205.

The client 280 may be representative of a plurality of client devices that may be coupled to the network 275. The client 280 may comprise, for example, a processor-based system such as a computer system. Such a computer system may be embodied in the form of a laptop computer, personal digital assistants, cellular telephones, smartphones, tablet computer systems, or other devices with like capability.

The client 280 may include a request module 282 configured to send a request to park the autonomous vehicle 205. The request module 282 may send the request after the autonomous vehicle 205 drives to a preselected location. In addition, the request module 282 may send the request to park the autonomous vehicle 205 after a passenger associated with the client 280 exits from the autonomous vehicle 205 at the preselected location. In one example, the request module 282 may send instructions to the autonomous vehicle 205 parked in the available parking space to return to the preselected location. Alternatively, the request module 282 may send instructions to the autonomous vehicle 205 parked in the available parking space to drive to a modified location in order to pick up the passenger.

The client 280 may include a notification module 284 configured to receive a confirmation message when the autonomous vehicle 205 is parked in the available parking space. The confirmation message may include a parking location associated with the autonomous vehicle 205. In addition, the notification module 284 may receive a notification when the autonomous vehicle 205 has arrived back at the preselected location or when the autonomous vehicle 205 has arrived at the modified location. In one example, the notification module 284 may receive a notification when the autonomous vehicle 205 has automatically returned to the preselected location in accordance with a schedule associated with a passenger of the autonomous vehicle 205.

The client 280 may include or be coupled to an output device 286. The output device 286 may comprise, for example, one or more devices such as cathode ray tubes (CRTs), liquid crystal display (LCD) screens, gas plasma-based flat panel displays, LCD projectors, or other types of display devices, etc.

Figure 3:
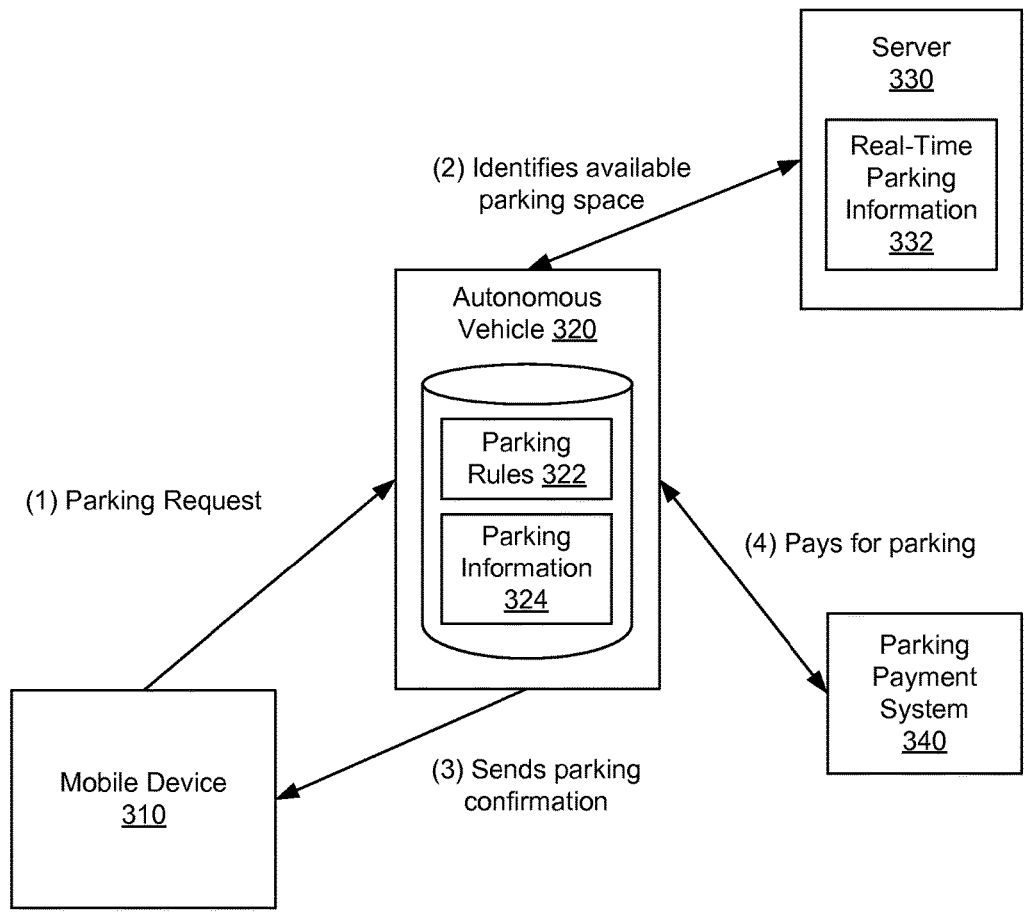
FIG. 3 illustrates a system and related operations for parking an autonomous vehicle according to an example of the present technology.

FIG. 3 illustrates an exemplary system and related operations for parking an autonomous vehicle 320. The autonomous vehicle 320 may contain a passenger with a mobile device 310. For example, the passenger may be carrying the mobile device 310 in the passenger's pocket. The passenger may direct the autonomous vehicle 320 to drive to a selected location. Alternatively, the passenger may drive the autonomous vehicle 320 to the selected location. The selected location may be a desired destination of the passenger within the autonomous vehicle 320. The selected location may also be referred to as a drop-off location. For example, the selected location may include a restaurant, a shopping mall, a movie theater, a museum, a library, a sports stadium, a particular home, etc. In one example, the passenger may define the selected location as a particular address, geographical coordinates, a street intersection, etc. The passenger may provide the selected location using a console within the autonomous vehicle 320.

The autonomous vehicle 320 may drive to the selected location. In particular, one or more processors within the autonomous vehicle 320 may provide commands to drive the autonomous vehicle 320 from a current location to the selected location. The commands may control the autonomous vehicle's actuators, thereby controlling steering, acceleration, braking and throttle of the autonomous vehicle 320. The autonomous vehicle 320 may stop at a drop off area in proximity to the selected location (e.g., near an entry of a restaurant, near an entry at a shopping mall). The autonomous vehicle 320 may stop at the drop off area in a manner that does not block other vehicles or pedestrians. The passenger may exit the autonomous vehicle 320, and using the mobile device 310, the passenger may instruct the autonomous vehicle 320 to park in an available parking space. In other words, the mobile device 310 may send a parking request to the autonomous vehicle 320. In an alternative configuration, the autonomous vehicle 320 may receive parking instructions from the passenger via controls within the autonomous vehicle 320.

The autonomous vehicle 320 may receive the parking request, and then identify a parking area that potentially includes an available parking space to park the autonomous vehicle 320. In one example, the parking request from the passenger may include a preselected parking area, such as a parking area that is already known by the passenger. For example, the preselected parking area included in the parking rules 322 may have been previously used to park the autonomous vehicle 320 when traveling to the selected location. In this example, after receiving the preselected parking area in the parking request, the autonomous vehicle 320 may provide commands to drive the autonomous vehicle 320 from the selected location (or the drop-off location) to the preselected parking area in order to search for an available parking space. In other words, the autonomous vehicle 320 may drive within the preselected parking area, and after identifying an available parking space, the autonomous vehicle 320 may park in the available parking space.

In one configuration, the autonomous vehicle 320 may receive the parking request, and then identify a parking area that potentially includes an available parking space based, in part, on a parking prioritization scheme included in the parking rules 322. The parking rules 322 may be previously defined by the passenger or the autonomous vehicle's owner. The parking rules 322 may define a list of different types of parking areas that are preferred by the passenger. For example, parking areas with potentially available parking spaces that are free of cost and within a defined distance from the drop-off location may be assigned a first priority level. Parking areas with potentially available parking spaces that are within a defined cost range and within the defined distance from the drop-off location may be assigned a second priority level. Other parking areas, such as parking areas that are outside the defined cost range and/or not within the defined distance from the drop-off location, may be assigned a third priority level.

In one example, in addition to the parking rules 322, the autonomous vehicle 320 may use parking information 324 to identify the parking area that potentially includes the available parking space. The parking information 324 may describe a plurality of parking areas in which the autonomous vehicle 320 may find an available parking space to park the autonomous vehicle 320. The parking areas may include, but are not limited to, parking garages, parking lots, streets with parking spaces, etc. In addition, the parking information 324 may provide information about parking fees associated with each of the parking areas, certain parking restrictions for each of the parking areas (e.g., two-hour parking), etc. In one example, the autonomous vehicle 320 may identify a list of parking areas that are in proximity to the selected location (or drop-off location) using the parking information 324, and then narrow the list of parking areas based on the parking rules 322 defined by the passenger. Therefore, the autonomous vehicle 320 may use a combination of the parking rules 322 and the parking information 324 when selecting a parking area that potentially includes an available parking space.

In one configuration, the autonomous vehicle 320 may receive real-time parking information 332 from a server 330, and then use the real-time parking information 332 to select the parking area. In one example, the real-time parking information 332 may indicate parking spaces that are currently available in a specific parking area (e.g., a specific parking garage). In one example, the autonomous vehicle 320 may query the server 330 over available parking spaces in a particular parking area, and the server 330 may respond with a message indicating whether that particular parking area currently has available parking spaces. Based on the response received from the server 330, the autonomous vehicle 320 may determine whether or not to drive to that parking area.

Therefore, based on the parking rules 322 and the parking information 324, the autonomous vehicle 320 may select a parking area that potentially has at least one available parking space, and then the autonomous vehicle 320 may provide commands to drive to the parking area. The autonomous vehicle 320 may arrive at the parking area and then drive within the parking area in search of an available parking space. The autonomous vehicle 320 may provide commands to park after detecting an available parking space in the parking area. The autonomous vehicle 320 may detect markings associated with the available parking space and park within the markings. If the autonomous vehicle 320 does not find an available parking space in the parking area, then the autonomous vehicle 320 may select another parking area and provide commands to drive to the other parking area in search for an available parking space. In one example, the autonomous vehicle 320 may generate a list of parking areas based on the parking rules 322 and the parking information 324. If a first parking area on the list does not have any available parking spaces, then the autonomous vehicle 320 may drive to a second parking area on the list, and so on.

In one example, a particular parking area may include various types of parking spaces. For example, a given parking area may include free parking, charged parking, parking with a defined time constraint (e.g., three-hour parking), etc. The passenger may define, in the parking rules 322, various criteria for selecting a particular parking space within the parking area. Therefore, the autonomous vehicle 320 may use both the parking rules 322 and the parking information 324 for selecting the parking area, as well as for selecting a particular parking space within a selected parking area. In one example, the parking rules 322 may indicate that the autonomous vehicle 320 is to select an available parking space that is not directly adjacent to another parked vehicle in the parking area. As another example, the parking rules 322 may indicate that the autonomous vehicle 320 is to park in a covered parking space in the parking area, as opposed to an uncovered parking space.

As a non-limiting example, the parking rules 322 may indicate that parking the autonomous vehicle 320 in a free available space (e.g., free public parking) is a highest priority when parking the autonomous vehicle 320. Based on the parking information 324, and in conjunction with the parking information 324, the autonomous vehicle 320 may identify three parking areas that are in proximity to the selected location (or drop-off location), and each of the three parking areas may provide free parking. Therefore, the autonomous vehicle 320 may select one of the parking areas and provide commands to drive to that parking area in search of an available parking space. If that parking area does not have any available parking spaces, then the autonomous vehicle 320 may drive to one of the two remaining parking areas in search of an available parking space. In one example, based on the parking information 324, there may be no parking areas in proximity to the selected location (or drop-off location) that offer free parking. In this case, the autonomous vehicle 320 may identify parking areas in proximity to the drop-off location that offer parking within a defined cost range, as defined in the parking rules 322. For example, the autonomous vehicle 320 may identify, using the parking information 324, three parking areas in proximity to the drop-off location: a first parking area may include parking spaces at $2 an hour, second parking area may include parking spaces at $3 an hour, and a third parking area may include parking spaces at $4 an hour. The autonomous vehicle 320 may select a parking area with a lowest cost as compared to the other parking areas. Therefore, the autonomous vehicle 320 may drive to the first parking area in search of an available parking space. If the first parking area does not have available parking spaces, then the autonomous vehicle 320 may try the second parking area, and then the third parking area. Other parking areas (e.g., parking areas with increased parking costs) may be assigned a lowest priority level in accordance with the parking rules 322.

In one example, the parking rules 322 may indicate that the selected parking area is to be within a defined distance from the selected location (or drop-off location). As a non-limiting example, the parking rules 322 may restrict parking areas that are greater than two miles from the selected location. In another example, the parking rules 322 may require that the parking area be within a predefined travel time from the selected location. As a non-limiting example, the parking rules 322 may impose that a travel time between the parking space and the selected location be within ten minutes. In other words, the autonomous vehicle 320 is to travel from the parking space back to the selected location within ten minutes. Therefore, the autonomous vehicle 320 may select a parking area for parking the autonomous vehicle 320 that is in accordance with the defined distance and predefined travel time constraints included in the parking rules 322.

The autonomous vehicle 320 may send a confirmation message to the mobile device 310 after parking in the available parking space within the selected parking area. The confirmation message may indicate that the autonomous vehicle 320 was successfully parked in the parking area. The parking confirmation message may include a parking location for the autonomous vehicle 320. In addition, the parking confirmation message may include a cost associated with parking the autonomous vehicle 320 in the parking area. Therefore, the passenger may learn when the autonomous vehicle 320 is parked (e.g., 2 PM) and the parking area in which the autonomous vehicle 320 is located.

In one configuration, the autonomous vehicle 320 may communicate with a parking payment system 340 when parking in the parking area. For example, the parking payment system 340 may be associated with a parking garage or a city parking system. When the autonomous vehicle 320 parks in the available parking space, the autonomous vehicle 320 may notify the parking payment system 340. For example, the autonomous vehicle 320 may send a first message with a first time stamp to the parking payment system 340 when the autonomous vehicle 320 parks in the parking area. In addition, the first message may include billing information for the passenger associated with the autonomous vehicle 320. When the autonomous vehicle 320 leaves the parking area, a second message with a second time stamp may be communicated to the parking payment system 340 indicating that the autonomous vehicle 320 has exited the parking area. The parking payment system 340 may calculate an amount of time the autonomous vehicle 320 was parked in the parking area based on the first time stamp and the second time stamp. The payment parking system 340 may automatically charge the passenger associated with the autonomous vehicle 320 using the passenger's billing information. In another example, the parking payment system 340 may only charge the passenger when the autonomous vehicle 320 enters or exits the parking area.

In an alternative configuration, the autonomous vehicle 320 may be equipped with a radio frequency (RF) identity (ID) tag. The RFID tag may be associated with the passenger's account information. The parking area may include enter and exit lanes that are equipped with an RFID tag reader. When the autonomous vehicle 320 enters or exits the parking area, the RFID tag reader may identify the passenger's account information from the RFID tag. The RFID tag reader may function in conjunction with the parking payment system 340 to charge the passenger an appropriate fee for parking the autonomous vehicle 320 in the parking area.

Figure 4:
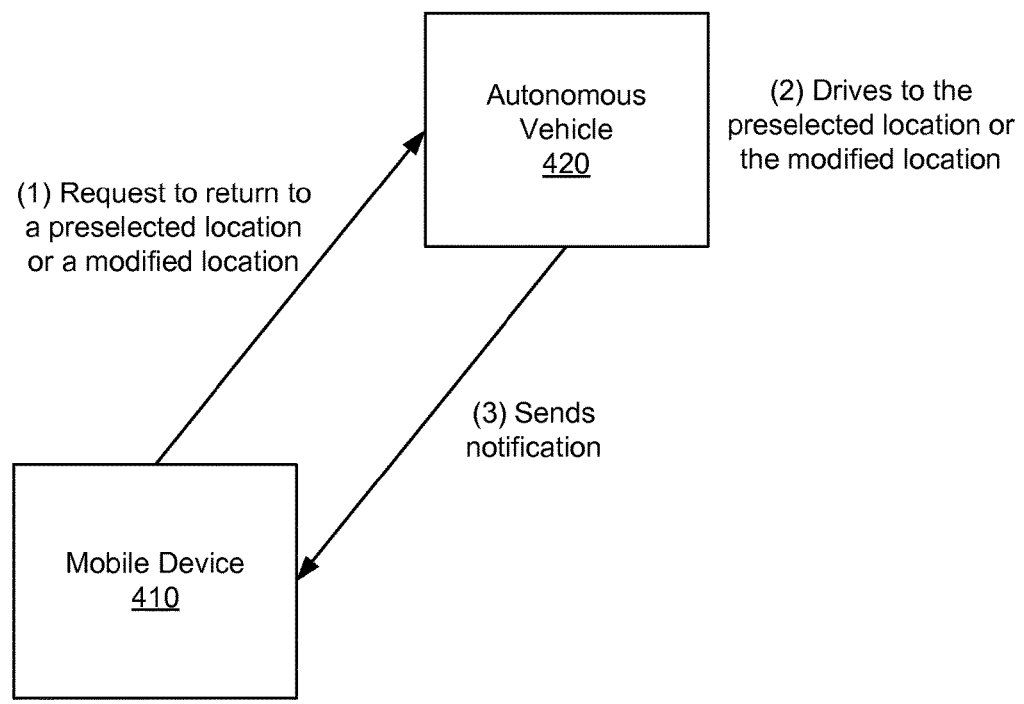
FIG. 4 illustrates a system and related operations for retrieving an autonomous vehicle according to an example of the present technology.

FIG. 4 illustrates an exemplary system and related operations for retrieving an autonomous vehicle 420. A user or passenger, via a mobile device 410, may send a message to the autonomous vehicle 420 requesting that the autonomous vehicle 420 return to a selected location. For example, the autonomous vehicle 420 may have previously dropped off the passenger at the selected location, and at a later time, the passenger may wish for the autonomous vehicle 420 to return back to the selected location.

As a non-limiting example, the autonomous vehicle 420 may have dropped off the passenger at an entry area of a movie theater. The passenger may have exited the autonomous vehicle 420 and entered the movie theater. Meanwhile, the autonomous vehicle 420 may have identified an available parking space to park the autonomous vehicle 420. At the conclusion of the movie, the passenger may wish to retrieve the autonomous vehicle 420. Therefore, the passenger may instruct the autonomous vehicle 420 to return back to the entry area of the movie theater in order to pick up the passenger.

In one example, the mobile device 410 may send a pickup request to the autonomous vehicle 420, wherein the pickup request instructs the autonomous vehicle 420 to return to the selected location. The pickup request may instruct the autonomous vehicle 420 to immediately start driving to the selected location. Alternatively, the pickup request may specify that the autonomous vehicle 420 arrive at the selected location at a selected time (e.g., in 10 minutes or in 20 minutes). In an alternative configuration, the pickup request may instruct the autonomous vehicle 420 to drive to a modified location in order to pick up the passenger. In a more specific example, the pickup request may instruct the autonomous vehicle 420 to drive to the mobile device's current location. The pickup request can include location information (e.g., geographical coordinates) associated with the mobile device's current location. The autonomous vehicle 420 may drive to the selected location or the modified location to pick up the passenger. In other words, one or more processors of the autonomous vehicle 420 may provide commands to drive the autonomous vehicle 420 to the selected location or the modified location.

In one configuration, the autonomous vehicle 420 may automatically adjust one or more settings before arriving at the selected location. For example, the autonomous vehicle 420 may set an internal temperature of the autonomous vehicle 420 (i.e., a cabin temperature) to a defined value. As another example, the autonomous vehicle 420 may turn on the seat heaters before arriving at the selected location. In yet another example, the autonomous vehicle 420 may turn on an audio system before arriving at the selected location. In one example, the settings may be previously defined by the passenger, and the autonomous vehicle 420 may adjust the settings automatically before arriving at the selected location. In another example, the pickup request sent from the mobile device 410 may include instructions for the autonomous vehicle 420 to adjust one or more settings before arriving at the selected location.

The autonomous vehicle 420 may send a notification to the mobile device 410 indicating that the autonomous vehicle 420 is driving to the selected location or the modified location. In one example, the autonomous vehicle 420 may also notify the mobile device's user when the autonomous vehicle 420 has arrived at the selected location or the modified location. The autonomous vehicle 420 may wait at the selected location for a defined period of time (e.g., two minutes), and if the passenger does not enter the autonomous vehicle 420 within that period of time, the autonomous vehicle 420 may send another notification to the mobile device 410. The passenger may enter into the autonomous vehicle 420 and direct the autonomous vehicle 420 to drive to a particular destination.

In one configuration, the autonomous vehicle 420 may authorize or authenticate the passenger before allowing the passenger to enter into the autonomous vehicle 420. In other words, the autonomous vehicle 420 may verify that the passenger is allowed to enter into the autonomous vehicle 420. In one example, the passenger may be carrying a keychain that, if placed in proximity to the autonomous vehicle 420, may verify that the passenger is authorized to enter into the autonomous vehicle 420. As another example, the passenger may carry a vehicle key and enter the autonomous vehicle 420 using the vehicle key. As yet another example, the autonomous vehicle 420 may detect that the passenger's mobile device 410 is in proximity to the autonomous vehicle 420, and therefore, the passenger is presumed to be carrying the mobile device 410 and is authorized to enter into the autonomous vehicle 420.

The technology described herein may allow the passenger to not be burdened with searching for an available parking space. In addition, the technology described herein may relieve the passenger of walking back and forth between the selected location (e.g., a restaurant) and the parking space in which the autonomous vehicle 420 is parked. Thus, during harsh weather conditions (e.g., rain, snow), the passenger is not burdened by walking between the parking space and the selected location. For example, the passenger may provide instructions to park the autonomous vehicle 420 upon arriving at the selected location, and then at a later time, the passenger can instruct the autonomous vehicle 420 to pick up the passenger. An additional benefit may be that the autonomous vehicle 420 is not limited to parking in a congested parking area that is in proximity to the selected location. For examples, in city centers with limited parking, the autonomous vehicle 420 may not be restricted to parking nearby the selected location. Rather, the autonomous vehicle 420 may potentially travel several miles from the selected location in order to park in a less congested area. In addition, the passenger may save money by parking the autonomous vehicle 420 in a further, less congested area.

Figure 5:
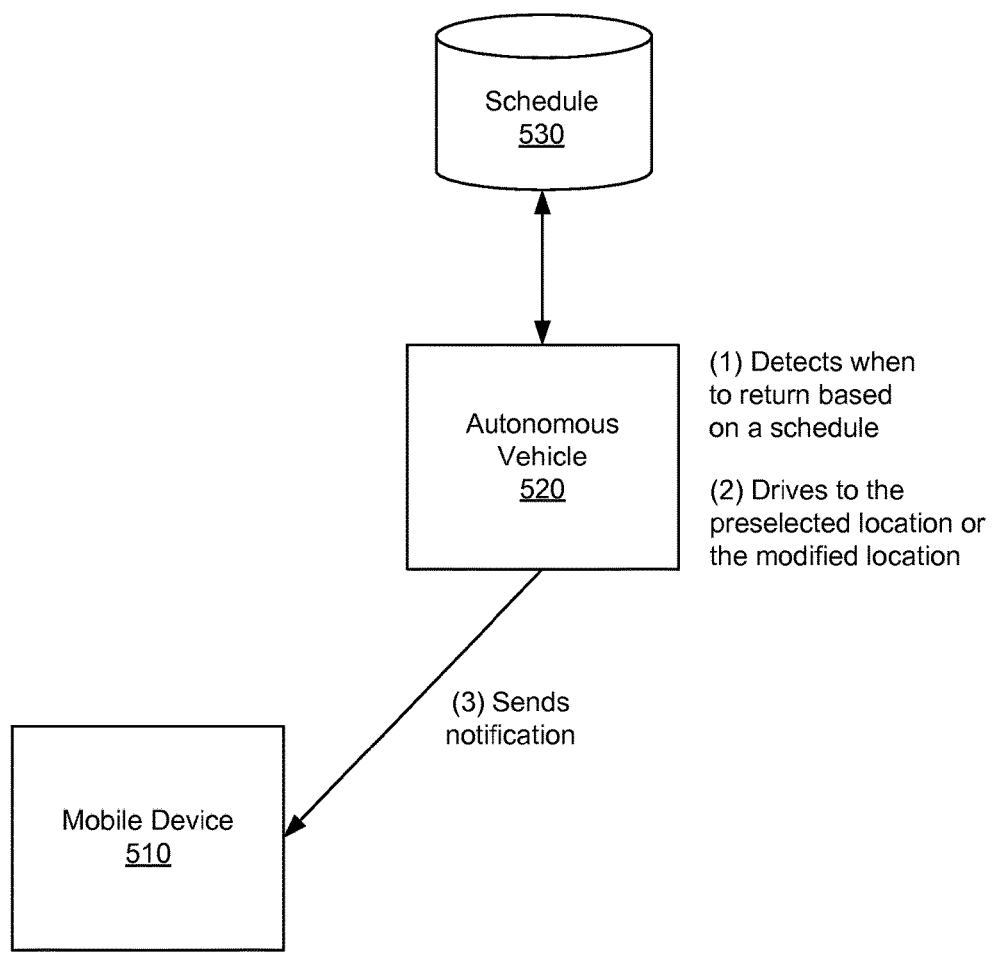
FIG. 5 illustrates a system and related operations for driving an autonomous vehicle to a selected location based on a schedule according to an example of the present technology.

FIG. 5 illustrates an exemplary system and related operations for driving an autonomous vehicle 520 to a selected location in accordance with a schedule. A passenger within the autonomous vehicle 520 may instruct the autonomous vehicle 520 to drive to the selected location (e.g., a dentist office). After arriving at the selected location, the passenger may exit the autonomous vehicle 520 and using a mobile device 510, the passenger may instruct the autonomous vehicle 520 to identify an available parking space and park in the available parking space. One or more processors of the autonomous vehicle 520 may provide instructions to drive the autonomous vehicle 520 to a selected parking area in search for an available parking space. The autonomous vehicle 520 may park in an available space, and then send a notification to the mobile device 510.

In one configuration, the autonomous vehicle 520 may automatically return to the selected location at a predefined time according to the schedule 530. In one example, the schedule 530 may be associated with the passenger of the autonomous vehicle 520. The autonomous vehicle 520 may arrive at the selected location, and then send a notification to the mobile device 510. In one configuration, the autonomous vehicle 520 may return to the selected location according to the schedule 530 and wait for the passenger for a defined period of time (e.g., ten minutes). If the passenger does not return within the defined period of time, the autonomous vehicle 520 may park again and wait for explicit instructions from the passenger's mobile device 510 before driving back to the selected location.

As a non-limiting example, the passenger's schedule 530 may indicate that the passenger has a dentist appointment from 3-4 PM. The autonomous vehicle 520 may drop off the passenger at an entry area of the dentist office at 3 PM, and then park in an available parking space. Based on the schedule 530, the autonomous vehicle 520 may automatically return back to the entry area of the dentist office in anticipation of the passenger finishing the appointment by 4 PM. In other words, the autonomous vehicle 520 may already be waiting for the passenger when the passenger finishes the appointment and walks outside to the entry area of the dentist office.

Figure 6:
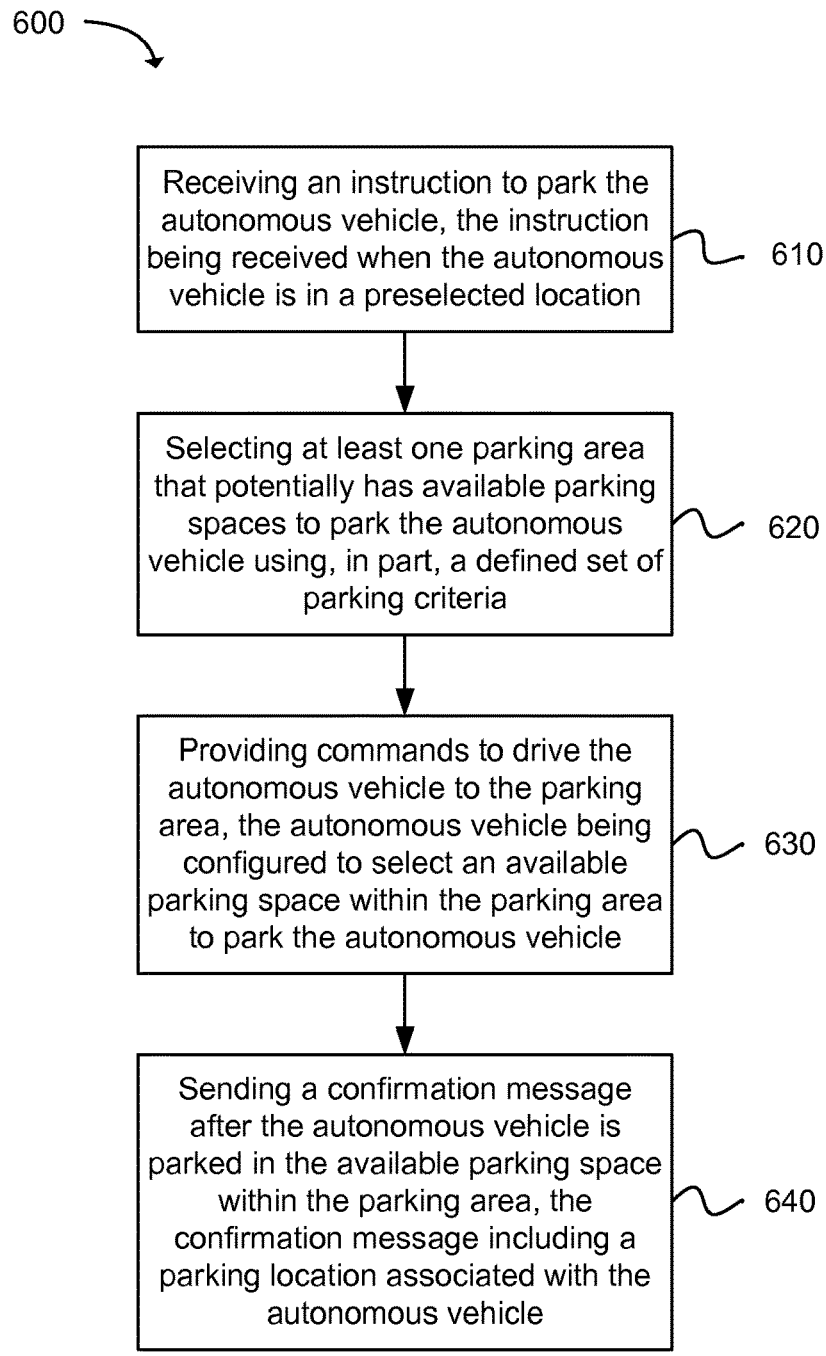
FIG. 6 is a flowchart of a method for parking autonomous vehicles according to an example of the present technology.

FIG. 6 illustrates an example of a method 600 for parking autonomous vehicles. The method may be executed as instructions on a machine, where the instructions are included on at least one computer readable medium or one non-transitory machine readable storage medium. The method may be executed by one or more processors on the machine. The method may include the operation of receiving an instruction to park the autonomous vehicle, the instruction being received when the autonomous vehicle is in a preselected location, as in block 610. The method may include the operation of selecting at least one parking area that potentially has available parking spaces to park the autonomous vehicle using, in part, a defined set of parking criteria, as in block 620. The method may include the operation of providing commands to drive the autonomous vehicle to the parking area, the autonomous vehicle being configured to select an available parking space within the parking area to park the autonomous vehicle, as in block 630. The method may include the operation of sending a confirmation message after the autonomous vehicle is parked in the available parking space within the parking area, the confirmation message including a parking location associated with the autonomous vehicle, as in block 640.

In one example, the parking area is preselected by a user associated with the autonomous vehicle. In one example, the defined set of parking criteria used to select the parking area indicates that: parking areas with parking spaces that are free of cost and within a defined distance from the preselected location are assigned a first priority level; parking areas with parking spaces that are within a first cost range and are within the defined distance from the preselected location are assigned a second priority level; and parking areas with parking spaces that are within a second cost range and are within the defined distance from the preselected location are assigned a third priority level.

In one example, the available parking space identified to park the autonomous vehicle is within a predefined travel time from the preselected location and within a defined distance from the preselected location in accordance with the defined set of parking criteria. In one example, the method may further include the operations of: receiving the instruction to park the autonomous vehicle from a passenger that has exited the autonomous vehicle at the preselected location; and sending the confirmation message to a mobile device associated with the passenger when the autonomous vehicle is parked in the available parking space.

In one example, the method may further include the operations of: receiving instructions to return the autonomous vehicle to the preselected location when the autonomous vehicle is parked in the available parking space; providing commands to drive the autonomous vehicle to the preselected location; and sending a notification when the autonomous vehicle has returned to the preselected location. In one example, the method may further include the operations of: waiting at the preselected location for one or more passengers to return to the autonomous vehicle; and sending an additional notification when the one or more passengers have not returned to the autonomous vehicle after a predefined period of time.

In one example, the method may further include the operation of: authenticating the one or more passengers before allowing the passengers to enter into the autonomous vehicle at the preselected location. In one example, the method may further include the operations of: receiving instructions to drive the autonomous vehicle to a modified location when the autonomous vehicle is parked in the available parking space; providing commands to drive the autonomous vehicle to the modified location; and sending a notification when the autonomous vehicle has arrived at the modified location. In one example, the method may further include the operation of: providing commands to automatically return the autonomous vehicle to the preselected location at a predefined time according to a schedule associated with a passenger of the autonomous vehicle. In one example, the method may further include the operation of: providing compensation to a parking payment system for parking the autonomous vehicle in the available parking space.

Figure 7:
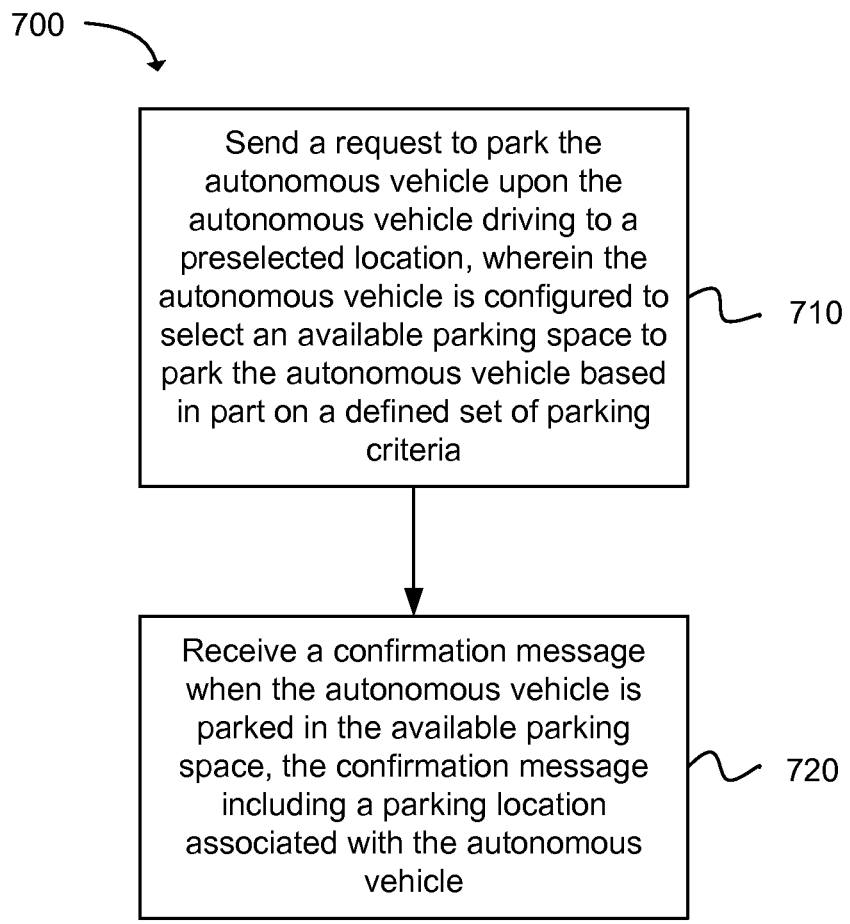
FIG. 7 depicts functionality of a mobile device operable to communicate with an autonomous vehicle according to an example of the present technology.

Another example provides functionality 700 of a mobile device operable to communicate with an autonomous vehicle, as shown in the flow chart in FIG. 7. The functionality can be implemented as a method or the functionality can be executed as instructions on a machine, where the instructions are included on at least one computer readable medium or one non-transitory machine readable storage medium. The method may be executed by one or more processors on the machine. The mobile device may be configured to send a request to park the autonomous vehicle upon the autonomous vehicle driving to a preselected location, wherein the autonomous vehicle is configured to select an available parking space to park the autonomous vehicle based in part on a defined set of parking criteria, as in block 710. The mobile device may be configured to receive a confirmation message when the autonomous vehicle is parked in the available parking space, the confirmation message including a parking location associated with the autonomous vehicle, as in block 720.

In one example, the mobile device may send the request to park the autonomous vehicle upon a passenger associated with the mobile device exiting from the autonomous vehicle at the preselected location. In another example, the mobile device may send instructions to the autonomous vehicle parked in the available parking space to return to the preselected location; and receive a notification when the autonomous vehicle has arrived at the preselected location. In yet another example, the mobile device may send instructions to the autonomous vehicle parked in the available parking space to drive to a current location associated with the mobile device; and receive a notification when the autonomous vehicle has arrived at the current location of the mobile device. In addition, the mobile device may receive a notification when the autonomous vehicle has automatically returned to the preselected location in accordance with a schedule associated with a passenger of the autonomous vehicle.

Figure 8:
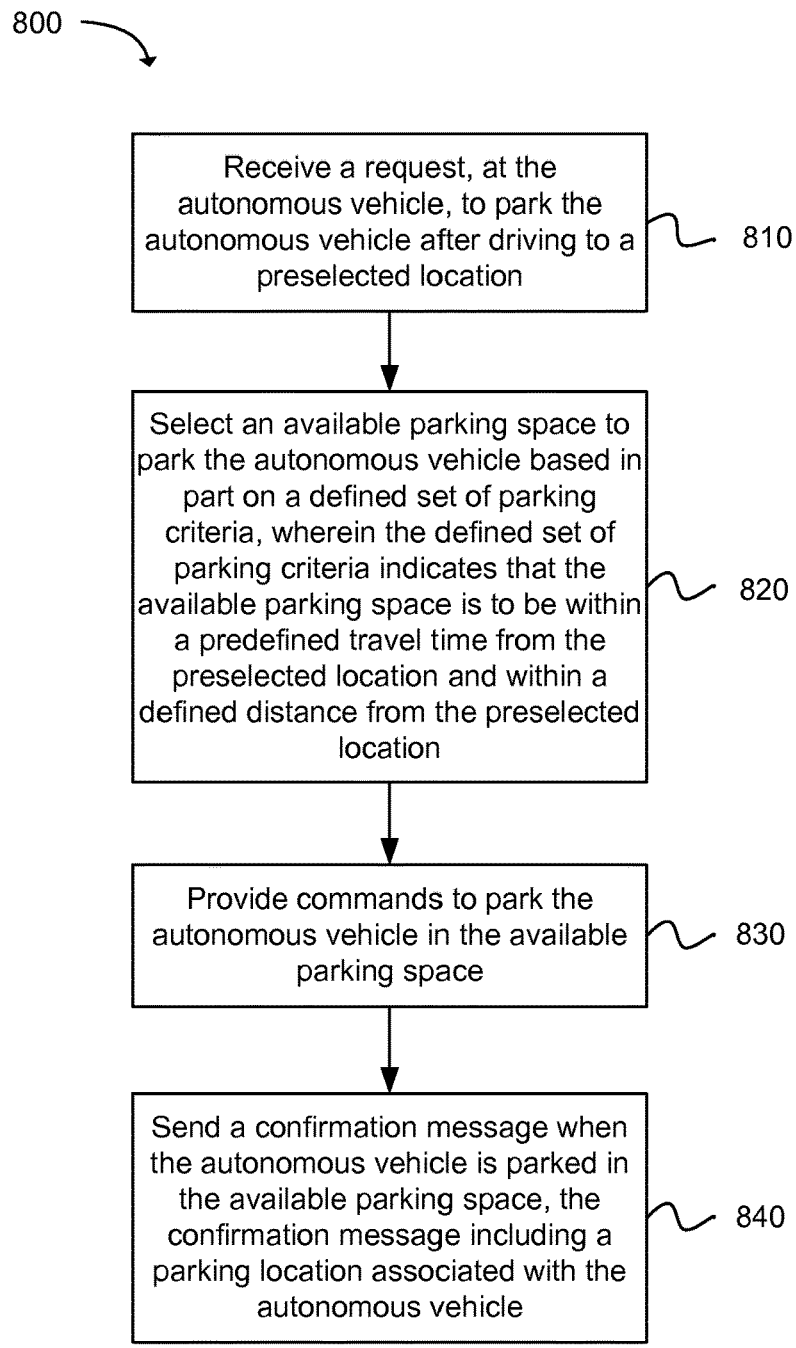
FIG. 8 depicts functionality of an autonomous vehicle according to an example of the present technology.

Another example provides functionality 800 of an autonomous vehicle, as shown in the flow chart in FIG. 8. The functionality can be implemented as a method or the functionality can be executed as instructions on a machine, where the instructions are included on at least one computer readable medium or one non-transitory machine readable storage medium. The method may be executed by one or more processors on the machine. The autonomous vehicle may be configured to select an available parking space to park the autonomous vehicle based in part on a defined set of parking criteria, wherein the defined set of parking criteria indicates that the available parking space is to be within a predefined travel time from the preselected location and within a defined distance from the preselected location, as in block 810. The autonomous vehicle may be configured to provide commands to park the autonomous vehicle in the available parking space, as in block 820. The autonomous vehicle may be configured to send a confirmation message when the autonomous vehicle is parked in the available parking space, the confirmation message including a parking location associated with the autonomous vehicle, as in block 830.

In one example, the autonomous vehicle may provide compensation to a parking payment system for parking the autonomous vehicle in the available parking space. In one example, the autonomous vehicle may authenticate one or more passengers before allowing the passengers to enter into the autonomous vehicle after returning to the preselected location. In one example, the autonomous vehicle may provide commands to drive the autonomous vehicle through one or more parking areas potentially having available parking spaces to park the autonomous vehicle, wherein the one or more parking areas are preselected by a passenger associated with the autonomous vehicle or selected by the autonomous vehicle using the defined set of parking criteria; and select the available parking space to park the autonomous vehicle within one of the parking areas in accordance with the defined set of parking criteria.

Figure 9:
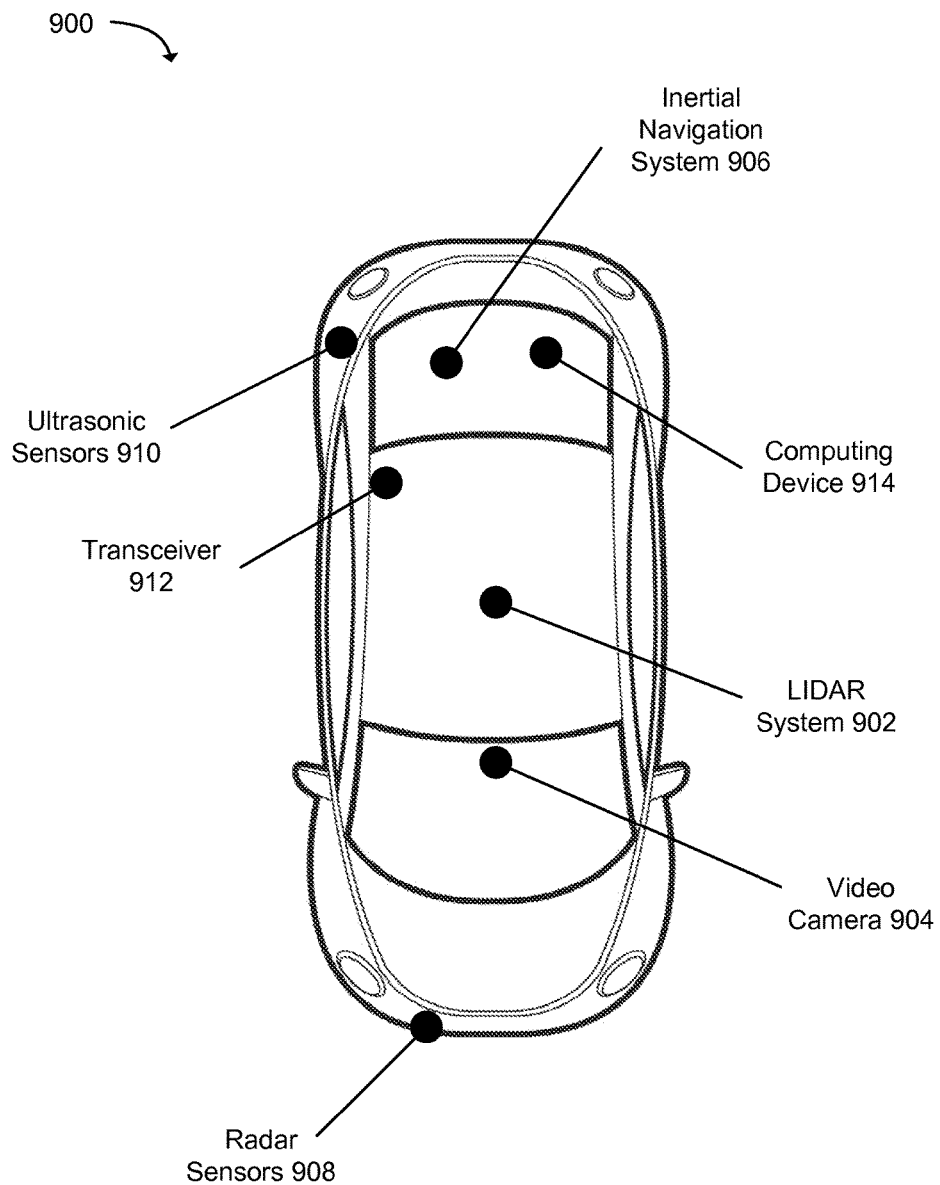
FIG. 9 illustrates an autonomous vehicle according to an example of the present technology.

FIG. 9 illustrates an example of an autonomous vehicle 900 that is capable of sensing a surrounding environment and navigating itself to a destination. The autonomous vehicle 900 may be classified as a "Level 0" autonomous vehicle, a "Level 1" autonomous vehicle, a "Level 2" autonomous vehicle, a "Level 3" autonomous vehicle, or a "Level 4" autonomous vehicle. In Level 0, a driver may control the autonomous vehicle 900 at substantially all times. The driver may be in complete and sole control of primary vehicle controls, such as brake, steering, throttle and motive power. In Level 1, one or more individual controls may be automated in the autonomous vehicle 900, such as electronic stability control or automatic braking, in which the vehicle may automatically assist with braking to enable the driver to regain control of the vehicle or stop faster than possible by acting alone. In Level 2, at least two controls may be automated in unison in the autonomous vehicle 900, such as adaptive cruise control in combination with lane keeping. In Level 3, the driver may cede full control of substantially all safety-critical functions to the autonomous vehicle 900 under certain traffic or environmental conditions. The autonomous vehicle 900 may sense when certain conditions necessitate the driver to retake control of the autonomous vehicle 900 and a sufficiently comfortable transition time may be provided for the driver to retake control of the autonomous vehicle 900. In Level 4, the autonomous vehicle 900 may perform substantially all safety-critical driving functions and monitor roadway conditions for an entire trip. The driver may provide destination or navigation input, but the driver may not be expected to control the autonomous vehicle 900 at any time during the trip. As the autonomous vehicle 900 may control all functions from start to stop, including parking functions, in level 4, the autonomous vehicle 900 may include both occupied and unoccupied vehicles. In one example, the autonomous vehicle 900 may be restricted to operating in certain environments or under certain conditions based on government regulations.

The autonomous vehicle 900 may include, but is not limited to, cars, trucks, motorcycles, buses, recreational vehicles, golf carts, trains, and trolleys. The autonomous vehicle 900 may include an internal combustion engine that operates using liquid fuels (e.g., diesel, gasoline). Alternatively, the autonomous vehicle 900 may include one or more electric motors that operate using electrical energy stored in batteries. The autonomous vehicle 900 may include, but is not limited to, a light detection and ranging (LIDAR) system 902, a video camera 904, an inertial navigation system 906, radar sensors 908, ultrasonic sensors 910, a transceiver 912, and a computing device 914 that, while working together in combination, enable the autonomous vehicle 900 to sense the environment and navigate to the destination with reduced user input. The autonomous vehicle 900 may use information captured by the various sensors, cameras, etc. to safely drive the autonomous vehicle 900 along a route to a destination, while avoiding obstacles and obeying traffic laws. The autonomous vehicle 900 may perform a series of steps when following the route to the destination. For example, the autonomous vehicle 900 may drive 500 meters, turn right, drive 1000 meters, turn left, etc. in order to reach the destination.

The LIDAR system 902 (also known as a laser range finder) may be mounted onto a surface (e.g., a top surface) of the autonomous vehicle 900. The LIDAR system 902 may emit a plurality of light pulses and measure an amount of time for the light pulses to return to the autonomous vehicle 900, thereby allowing the LIDAR system 902 to measure the distance of objects surrounding the autonomous vehicle 900. As a non-limiting example, the LIDAR system 902 may measure the distance of objects within 200 meters from the autonomous vehicle 900.

One or more video cameras 904 may be mounted to a front, rear or side portion of the autonomous vehicle 900. The autonomous vehicle 900 may use the LIDAR system 902 and the video camera 904 to build a three-dimensional (3D) map of the autonomous vehicle's surroundings. The 3D map may capture a 360-degree view around the autonomous vehicle 900. In one example, the 3D map may capture the autonomous vehicle's surroundings within 200 meters. The 3D map may include a variety of features, such as road edges, road signs, lane markings, guardrails, overpasses, etc. The 3D map may indicate stationary objects, such as buildings, telephone poles, mailboxes, etc. In addition, the 3D map may indicate moving objects, such as other vehicles, bicyclists, pedestrians, etc.

In one example, the 3D map generated using the LIDAR system 902 and the video camera 904 may be correlated with high-resolution maps of the world. The high-resolution maps may indicate lane markings, terrain, elevation, speed limits, and other features related to the route taken by the autonomous vehicle 900 when driving to the destination. In addition, the autonomous vehicle 900 may position or localize itself within the 3D map. In other words, the autonomous vehicle 900 may determine its position in relation to the objects included in the 3D map. The autonomous vehicle 900 may determine its position by using the inertial navigation system 906. The inertial navigation system 906 may calculate a position, orientation, and velocity (i.e., direction and speed of movement) of the autonomous vehicle 900.

The inertial navigation system 906 may include a combination of gyroscopes, altimeters, tachometers, gyroscopes and other motion-sensing devices in order to calculate the autonomous vehicle's position. The inertial navigation system 906 may determine an initial position and velocity, and thereafter compute the autonomous vehicle's updated position and velocity by integrating information received from the motion-sensing devices. In one example, a GPS receiver (not shown in FIG. 9) may provide the initial position of the autonomous vehicle 900 (e.g., latitude, longitude, altitude). Thereafter, the autonomous vehicle 900 may use the inertial navigation system 906 to determine its position in relation to the objects on the 3D map. As the autonomous vehicle 900 drives to the destination, updated positional information from the inertial navigation system 906 may continually update the 3D map of the autonomous vehicle's surroundings.

The radar sensors 908 may be mounted on front, rear and/or side sections of the autonomous vehicle 900. The radar sensors 908 may monitor a position of proximately-located vehicles on the road, such as vehicles immediately behind or in front of the autonomous vehicle 900. In addition, ultrasonic sensors 910 may be used to measure a distance to proximately-located objects, such as curbs or other vehicles when the autonomous vehicle 900 is parking. The radar sensors 908 and the ultrasonic sensors 910 may be used when generating and updating the 3D map of the autonomous vehicle's surroundings. For example, the radar sensors 908 and the ultrasonic sensors 910 may detect objects that are located in proximity to the autonomous vehicle 900 and those objects may be included in the 3D map of the autonomous vehicle's surroundings.

The transceiver 912 may allow the autonomous vehicle 900 to communicate with other devices or systems when driving to the destination. For example, the transceiver 912 may communicate with other vehicles on the road using vehicle-to-vehicle (V2V) communication. V2V communication may use dedicated short-range communications (DSRC) and operate in the 5.9 GHz frequency range. The range for V2V communication may be approximately 300 meters. In addition, the transceiver 912 may communicate with computing devices (e.g., mobile phones, tablet computers) that provide instructions to the autonomous vehicle 900 via wireless communication standards, such as Third Generation Partnership Project (3GPP) Long Term Evolution (LTE), Wi-Fi, WiMAX, Bluetooth, etc. The above list of wireless communication standards is non-limiting and is intended to include related wireless communication standards that are forthcoming. In one example, the transceiver 912 may enable the autonomous vehicle 900 to receive messages from the computing devices, such as messages requesting a pickup, messages instructing the autonomous vehicle 900 to perform a particular task, etc.

The computing device 914 may receive information collected and/or generated from the LIDAR system 902, the video cameras 904, the inertial navigation system 906, the radar sensors 908, the ultrasonic sensors 910, and the transceiver 912. The computing device 914 may process the information (e.g., the 3D map of the vehicle's surroundings) in real-time and determine whether to modify the autonomous vehicle's current velocity and orientation in response to the sensed environment. The computing device 914 may use the received information in order to provide commands to the autonomous vehicle's actuators, thereby controlling steering, acceleration, braking and throttle of the autonomous vehicle 900. The computing device 914 may perform the tasks of localization, 3D mapping, obstacle avoidance, path planning, etc. multiple times per second until the autonomous vehicle 900 reaches the destination. In addition, the computing device 914 may include a data store that stores various types of information, such as road speed limits, traffic accidents, road construction work, etc. The computing device 914 may receive the information from a server via the transceiver 912. The computing device 914 may use the various types of information received from the server for making intelligent decisions when guiding the autonomous vehicle 900 to the destination.

In one example, the computing device 914 or a portion of the computing device 914 may be in idle mode (e.g., a low power mode or a standby mode) when the autonomous vehicle 900 is shut off. For example, the computing device 914 may be in idle mode when the autonomous vehicle 900 is parked in a parking space. The computing device 914 may periodically check for messages that are received when the computing device 914 is in idle mode. For example, the computing device 914 may periodically check for messages received from a mobile device. The computing device 914 may transition from idle mode into an on mode upon receiving a message that instructs the autonomous vehicle 900 to perform a task (e.g., drive to a destination). In one configuration, the computing device 914 or the portion of the computing device 914 may be powered via energy harvesting when in idle mode. For example, the computing device 914 may derive energy from external sources in order to receive messages from the device. The external sources may include, but is not limited to, solar power, battery power, thermal power, wind energy, and kinetic energy.

Figure 10:
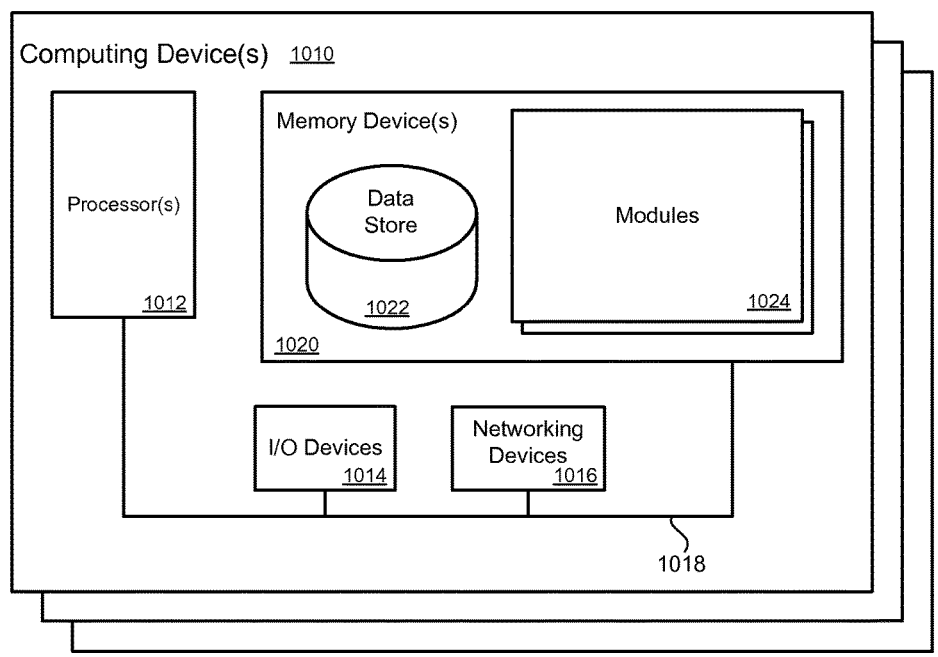
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. At least one non-transitory machine readable storage medium having instructions embodied thereon for parking an autonomous vehicle, the instructions when executed by one or more processors of the autonomous vehicle perform the following:

receiving an instruction to autonomously park the autonomous vehicle, the instruction being received after the autonomous vehicle has arrived to a preselected location;

selecting at least one parking area that potentially has available parking spaces to park the autonomous vehicle using, in part, a defined set of parking criteria, wherein the at least one parking area that is selected by the autonomous vehicle is associated with an increased priority level as compared to other parking areas within a defined distance from the preselected location based on the defined set of parking criteria;

providing commands to autonomously drive the autonomous vehicle to the at least one parking area that is associated with the increased priority level and that potentially has available parking spaces, the autonomous vehicle being configured to select an available parking space within a parking area to park the autonomous vehicle;

sending a confirmation message after the autonomous vehicle is parked in the available parking space within the parking area, the confirmation message including a parking location associated with the autonomous vehicle;

providing commands to autonomously drive the autonomous vehicle from the parking area to the preselected location or a modified location at a predefined time, wherein the autonomous vehicle is configured to wait at the preselected location or the modified location for a passenger to return to the autonomous vehicle; and providing commands to autonomously drive the autonomous vehicle to the at least one parking area to re-park the autonomous vehicle when the passenger does not return to the autonomous vehicle within a defined period of time.

2. The at least one non-transitory machine readable storage medium of claim 1, wherein the at least one parking area that potentially has available parking spaces to park the autonomous vehicle is preselected by a user associated with the autonomous vehicle.

3. The at least one non-transitory machine readable storage medium of claim 1, wherein the defined set of parking criteria used to select the parking area indicates that:

parking areas with parking spaces that are free of cost and within a defined distance from the preselected location are assigned a first priority level;

parking areas with parking spaces that are within a first cost range and are within the defined distance from the preselected location are assigned a second priority level; and parking areas with parking spaces that are within a second cost range and are within the defined distance from the preselected location are assigned a third priority level.

4. The at least one non-transitory machine readable storage medium of claim 1, wherein the available parking space identified to park the autonomous vehicle is within a predefined travel time from the preselected location and within a defined distance from the preselected location in accordance with the defined set of parking criteria.

5. The at least one non-transitory machine readable storage medium of claim 1, further comprising instructions which when executed by the one or more processors of the autonomous vehicle performs the following:

receiving the instruction to autonomously park the autonomous vehicle from a passenger that has exited the autonomous vehicle at the preselected location; and sending the confirmation message to a mobile device associated with the passenger when the autonomous vehicle is autonomously parked in the available parking space.

6. The at least one non-transitory machine readable storage medium of claim 1, further comprising instructions which when executed by the one or more processors of the autonomous vehicle performs the following:

receiving instructions to return the autonomous vehicle to the preselected location when the autonomous vehicle is parked in the available parking space; and sending a notification to a mobile device associated with a passenger of the autonomous vehicle when the autonomous vehicle has returned to the preselected location.

7. The at least one non-transitory machine readable storage medium of claim 6, further comprising instructions which when executed by the one or more processors of the autonomous vehicle performs the following:

sending an additional notification to the mobile device associated with the passenger of the autonomous vehicle when the passenger has not returned to the autonomous vehicle after a predefined period of time.

8. The at least one non-transitory machine readable storage medium of claim 7, further comprising instructions which when executed by the one or more processors of the autonomous vehicle performs the following: authenticating the one or more passengers after the autonomous vehicle has returned to the preselected location before allowing the passengers to enter into the autonomous vehicle at the preselected location.

9. The at least one non-transitory machine readable storage medium of claim 1, further comprising instructions which when executed by the one or more processors of the autonomous vehicle performs the following:

receiving instructions to drive the autonomous vehicle to the modified location when the autonomous vehicle is parked in the available parking space, wherein the modified location is different than the preselected location;

providing commands to drive the autonomous vehicle to the modified location; and sending a notification when the autonomous vehicle has arrived at the modified location.

10. The at least one non-transitory machine readable storage medium of claim 1, further comprising instructions which when executed by the one or more processors of the autonomous vehicle performs the following: providing commands to automatically return the autonomous vehicle to the preselected location at a predefined time according to a schedule associated with a passenger of the autonomous vehicle.

11. The at least one non-transitory machine readable storage medium of claim 1, further comprising instructions which when executed by the one or more processors of the autonomous vehicle performs the following: providing compensation to a parking payment system for parking the autonomous vehicle in the available parking space.

12. A mobile device operable to communicate with an autonomous vehicle, the mobile device comprising:

a display screen;

a processor;

a memory device including a data store to store a plurality of data and instructions that, when executed by the processor, cause the processor to:

send a request to park the autonomous vehicle upon the autonomous vehicle driving to a preselected location, wherein an available parking space is selected to park the autonomous vehicle based in part on a defined set of parking criteria, wherein the available parking space is selected in a parking area associated with an increased priority level as compared to other parking areas within a defined distance from the preselected location based on the defined set of parking criteria;

receive a confirmation message for display on the display screen when the autonomous vehicle is parked in the available parking space, the confirmation message including a parking location associated with the autonomous vehicle; and receive a second confirmation when the autonomous vehicle has returned to the preselected location or a modified location at a predefined time, wherein the autonomous vehicle is re-parked in the parking area when a passenger associated with the mobile device does not return to the autonomous vehicle within a defined period of time.

13. The mobile device of claim 12, wherein the plurality of data and instructions, when executed by the processor, cause the processor to: send the request to park the autonomous vehicle upon a passenger associated with the mobile device exiting from the autonomous vehicle at the preselected location.

14. The mobile device of claim 12, wherein the plurality of data and instructions, when executed by the processor, cause the processor to:
send instructions to the autonomous vehicle parked in the available parking space to return to the preselected location; and
receive the second notification when the autonomous vehicle has arrived at the preselected location.

15. The mobile device of claim 12, wherein the plurality of data and instructions, when executed by the processor, cause the processor to:
send instructions to the autonomous vehicle parked in the available parking space to drive to a current location associated with the mobile device; and
receive a notification when the autonomous vehicle has arrived at the current location of the mobile device.

16. The mobile device of claim 12, wherein the plurality of data and instructions, when executed by the processor, cause the processor to: receive a notification when the autonomous vehicle has automatically returned to the preselected location in accordance with a schedule associated with a passenger of the autonomous vehicle.

17. An autonomous vehicle, comprising:
one or more sensors;
a processor;
a memory device including a data store to store a plurality of data and instructions that, when executed by the processor, cause the processor to:
receive a request, at the autonomous vehicle, to park the autonomous vehicle after driving to a preselected location;
select an available parking space to park the autonomous vehicle based in part on a defined set of parking criteria, wherein the defined set of parking criteria indicates that the available parking space is to be within a predefined travel time from the preselected location and within a defined distance from the preselected location, wherein the available parking space is selected in a parking area associated with an increased priority level as compared to other parking areas within the defined distance from the preselected location based on the defined set of parking criteria;
provide commands to autonomously park the autonomous vehicle in the available parking space using the one or more sensors;
send a confirmation message when the autonomous vehicle is parked in the available parking space, the confirmation message including a parking location associated with the autonomous vehicle,
provide commands to autonomously drive the autonomous vehicle from the parking area to the preselected location or a modified location at a predefined time, wherein the autonomous vehicle is configured to wait at the preselected location or the modified location for a passenger to return to the autonomous vehicle; and
provide commands to autonomously drive the autonomous vehicle to the parking area to re-park the autonomous vehicle when the passenger does not return to the autonomous vehicle within a defined period of time.

18. The autonomous vehicle of claim 17, wherein the plurality of data and instructions, when executed by the processor, cause the processor to: provide compensation to a parking payment system for parking the autonomous vehicle in the available parking space.

19. The autonomous vehicle of claim 17, wherein the plurality of data and instructions, when executed by the processor, cause the processor to: authenticate one or more passengers after returning to the preselected location before allowing the passengers to enter into the autonomous vehicle at the preselected location.

20. The autonomous vehicle of claim 17, wherein the plurality of data and instructions, when executed by the processor, cause the processor to:
provide commands to drive the autonomous vehicle through one or more parking areas potentially having available parking spaces to park the autonomous vehicle, wherein the one or more parking areas are preselected by a passenger associated with the autonomous vehicle or selected by the autonomous vehicle using the defined set of parking criteria; and
select the available parking space to park the autonomous vehicle within one of the parking areas in accordance with the defined set of parking criteria.

* * * * *